June 7, 1966    J. K. MERTZWEILLER ET AL    3,255,259
OXO PROCESS FOR PRODUCING ALCOHOLS FROM OLEFINS
Filed March 7, 1961
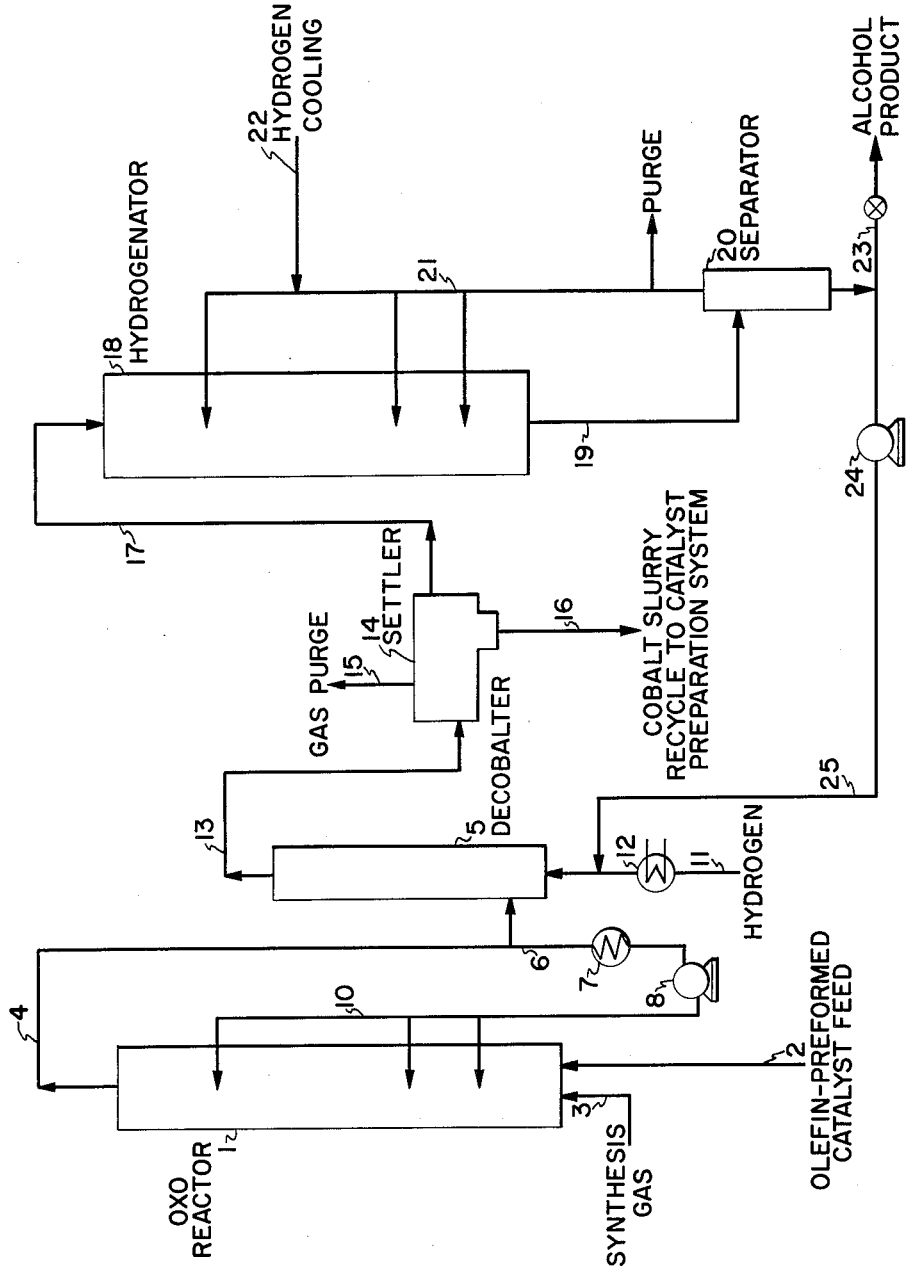
Joseph Kern Mertzweiller
Horace Marion Tenney    Inventors
By *Seymour Stahl*    Patent Attorney

3,255,259
OXO PROCESS FOR PRODUCING ALCOHOLS FROM OLEFINS

Joseph Kern Mertzweiller and Horace Marion Tenney, both of Baton Rouge, La., assignors to Esso Research and Engineering Company, a corporation of Delaware
Filed Mar. 7, 1961, Ser. No. 94,001
7 Claims. (Cl. 260—638)

The present invention relates to the production of alcohols from olefins. More particularly, the invention relates to a combination process wherein olefins are converted to aldehydes via the oxo reaction, and the aldehydes thus produced are catalytically hydrogenated to alcohols. Still more particularly, the invention relates to a combination process wherein olefins are converted to alcohols by reacting the olefin with carbon monoxide and hydrogen in the presence of a cobalt carbonyl catalyst and hydrogenating the thus obtained aldehydic product, all steps in said combination process being carried out at pressures in the range of 200 to 1500 p.s.i.g.

It is well known in the art that aldehyde compounds may be synthesized from organic compounds containing olefinic linkages by a reaction with carbon monoxide and hydrogen in the presence of catalysts containing metals of the iron group, particularly cobalt. The product of the carbonylation or oxo reaction, as this process is commonly known, predominantly comprises aldehydes having one more carbon atom than the olefinic reactant, although other oxygenated products are formed to a lesser degree. These aldehydes may be hydrogenated in the presence of any of the well known hydrogenation catalysts, such as supported or unsupported nickel, copper chromite, sulfactive catalysts such as the oxides or sulfides of tungsten, nickel or molybdenum, to provide the corresponding alcohols. The primary alcohols produced in this manner serve to supply the large market for plasticizers, detergents, solvents and the like. Alternatively, if desired, the oxo aldehydes may be converted to the coeresponding fatty acids by well known oxidation means, or to amines by reductive amination. Thus, the oxo process provides a practical and convenient route to a variety of useful products.

Amenable to the oxo or carbonylation step, to a greater or lesser degree, are not only the olefinic hydrocarbons, but also other organic compounds having a carbon-to-carbon olefinic linkage, such as unsaturated alcohols, acids, esters and the like. Where olefinic hydrocarbons are utilized, these may be derived from a wide variety of sources, the choice depending on the desired final product. Suitable olefins include both straight and branch-chain types such as propylene, butene, pentene, hexene, heptene and styrene, olefin polymers such as di- and triisobutylene, polypropylene, and hexene and heptene dimers, and olefinic fractions from the hydrocarbon synthesis reaction, from thermal or catalytic cracking, and from other petroleum processes as well.

The conditions for carbonylating olefins with carbon monoxide and hydrogen vary somewhat in accordance with the nature of the olefin feed and the carbonylation catalyst. In general, the lower olefins react at lower temperatures and to a greater extent than the higher olefins. Similarly, less stringent conditions are required when a pre-formed catalyst is utilized rather than a catalyst formed in situ. Generally, temperatures of about 250° to 450° F. and pressures of about 1500 to 4500 p.s.i.g. are employed; however, with pre-formed catalysts, temperatures and pressures as low as 200° F. and 300 p.s.i.g., respectively, may be used.

The synthesis gas mixture fed to the oxo stage may be any desired ratio of $H_2$ to CO, although ratios of between 0.5 to 5 volumes of hydrogen per volume of CO are preferred. The ratio of synthesis gas to olefin may also vary widely; in general, quantities of from about 2500 to 25,000 cubic feet of $H_2+CO$ per barrel of olefin feed are employed.

The catalyst for the oxo stage of the process is preferably an oil-soluble compound of the catalytically-active metal, although water-soluble catalysts such as cobalt acetate or cobalt chloride have also been used. Preformed catalyst, i.e., cobalt carbonyls produced apart from the carbonylation reaction, rather than in situ, such as described in U.S. 2,827,491, are especially advantageous. In general, catalyst concentrations of from about 0.05 to 5.0 weight percent, calculated as metal on olefin feed, are satisfactory.

In the production of alcohols via the oxo reaction, it has been the practice to depressurize the effluent from the oxo reactor, to pass the liquid products at atmospheric or near atmospheric pressure through a decobalting stage wherein the carbonylation catalyst and/or catalyst residues are removed, and then to re-pressurize the demetallized liquid product into the hydrogenation stage. Such a procedure which involves a substantial pressure reduction followed by a substantial pressure increase is economically inefficient. In the past, however, it has not been considered feasible to carry out the several steps of the process without large pressure variations. For example, at the usual oxonation pressures, it has not heretofore been possible to obtain that completeness of demetallizing required to avoid subsequent fouling of the hydrogenation catalyst as well as the hydrogenation equipment surfaces by cobalt metal, which occurs when the soluble cobalt compounds in the feed decompose under the conditions of hydrogenation. In turn, hydrogenation at pressures sufficiently low to obtain satisfactory decobalting has not been considered practicable.

These and other disadvantages are overcome by carrying out the carbonylation reaction at low pressure in the presence of a cobalt carbonyl catalyst, preferably a preformed catalyst, e.g., dicobalt octacarbonyl, and thermally soaking the liquid carbonylation product at a pressure not substantially greater than that used in the carbonylation reaction nor substantially lower than that employed in the subsequent hydrogenation step. It has been found that by carrying out the carbonylation and decobalting steps in this way, essentially all the soluble cobalt is surprisingly converted to a metallic form, which can readily be removed from the liquid product by any convenient means, e.g., gravity settling, centrifugation, magnetic separation and the like. The cobalt-free product thus provided can thereafter readily be hydrogenated over a fixed catalyst bed at pressures not substantially greater than those employed in the decobalting step and without fear of catalyst fouling. Thus, by combining the specific oxonation, thermal treating and hydrogenation steps of the present invention, means are provided for converting olefins to alcohols within the range of low pressures employed in the oxonation reactor. Because high pressures are not utilized in the present combination process, and an increase in pressure is not required in passing from one stage to another, significant savings in process equipment are realized.

While the exact manner in which the specific process steps of the present invention cooperate to produce these desirable results is not completely understood, experimental evidence suggests the following. By conducting the carbonylation reaction at low pressure and in the presence of a cobalt carbonyl catalyst, preferably a preformed catalyst, e.g., dicobalt octacarbonyl, a high degree of selectivity to aldehydes is realized. Only a small proportion of "bottoms" are formed, since secondary reactions are minimized. In particular, hydrogenation of aldehydes to alcohols, which may occur to the extent of 40–50 percent in high pressure carbonylation reactions, is minimized, less than 10 percent alcohols, based on aldehyde, being formed in the specific carbonylation stage of the present process. A minimum concentration of alcohols in the carbonylation step is desirable so as to avoid secondary reaction with the oxo aldehydes. While acetals thus formed are not especially harmful per se, water which simultaneously forms is undesirable. Under high pressures and elevated temperatures, water in the carbonylation step leads to the formation of carboxylic acids. These acids, particularly those having about five or more carbon atoms, interfere with the complete thermal decobalting of the carbonylation product, since under the elevated temperatures of the decobalting step, these acids appear to react with the cobalt metal initially formed to produce thermally stable, aldehyde-soluble, cobalt soaps. The thermally stable cobalt soaps remain dissolved in the aldehyde product even after thermal treatment; consequently, incomplete decobalting is realized which must then be completed by other decobalting means or by a combination of thermal and chemical treatments in order to obtain a hydrogenation feed uncontaminated with soluble cobalt compounds or complexes. The presence of soluble cobalt, especially soaps, introduced into the oxonation product either as the carbonylation catalyst or as the result of secondary reactions, and incompletely removed during decobalting, is believed to materially contribute to the "plating out" and inefficient hydrogenation previously experienced. By using a cobalt carbonyl catalyst prepared from non-fatty acid reactants, and low pressure conditions in the carbonylation step, the presence of cobalt soap-forming acid radicals is avoided, thermal conversion of cobalt catalyst to cobalt metal is complete, and the cobalt in metallic form is readily removable from the liquid carbonylation product. Hydrogenation of the product can thereafter be accomplished without fear of catalyst fouling and at pressures substantially the same as those utilized in the carbonylation step.

The present invention and its application will be more completely understood from the more detailed description hereinafter, wherein reference will be had to the accompanying drawing which schematically represents a system suitable for carrying out preferred embodiments of the invention.

Referring now to the drawing, an olefin feed containing dissolved therein from 0.05 to 1.0 weight percent of cobalt, calculated as metal on olefin feed, in the form of a cobalt carbonyl, e.g., dicobalt octacarbonyl, is passed into oxo reactor 1 via line 2. Synthesis gas comprising hydrogen and carbon monoxide in a molar ratio of about 1–2/1 is introduced through line 3. Under the conditions shown in Table I, the olefin, carbon monoxide and hydrogen react to yield a liquid, aldehyde-comprising product which contains less than 0.1 weight percent cobalt soap forming acid radicals less than 10 weight percent alcohols and less than 1 weight percent water, both percentages based on aldehydes. The liquid product, soluble cobalt carbonyl catalyst, and unreacted gases are removed from the reactor through line 4. A portion of this reactor effluent may be recycled to the reactor through line 6, cooler 7, pump 8 and line 10 to aid in cooling and maintaining the temperature of the carbonylation reaction at the desired level. The remainder of the reactor effluent is passed into decobalter 5, maintained at substantially the same pressure as in reactor 1, and is subjected therein to elevated temperatures and to dilution by heated hydrogen gas introduced through line 11 and heater 12. The addition of heated hydrogen gas not only serves to add sufficient heat to obtain the proper temperature level for efficient thermal decomposition of the cobalt catalyst to cobalt metal, but also serves to reduce the partial pressure of carbon monoxide. Suitable conditions for operating the decobalter are set forth in Table II.

The effluent from the decobalter, comprising a slurry of cobalt metal in the oxo product, is passed through line 13 into settler 14. Excess gases are purged from the settler through line 15, and the slurry is permitted to concentrate by gravity, magnetic means, or the like, in the bottom portion thereof. The concentrated slurry is removed through line 16 for recycle to a carbonylation catalyst preparation system (not shown), while the essentially cobalt-free product is removed through line 17 to hydrogenator 18 under substantially the same pressure as that in the decobalter. A fixed bed comprising a carbon monoxide insensitive hydrogenation catalyst, for example, molybdenum sulfide on char, is provided in the hydrogenation reactor, and under the conditions set forth in Table III, the aldehyde components of the liquid carbonylation product are converted to the corresponding alcohols. Product from the hydrogenator is removed through line 19 and passed into separator 20 wherein dissolved gases, predominantly hydrogen, are purged, or recycled via line 21 and admixed with additional hydrogen gas admitted through line 22 to cool the exothermic hydrogenation reaction. The liquid product is removed from the separator through line 23 for further finishing or purification of the alcohol therein, or in part, recycled through pump 24 and line 25 to provide at least some of the heat required in the decobalter.

As will be apparent to those skilled in the art, numerous modifications of the system illustrated may be made without departing from the spirit of the invention. For example, oxo reactor cooling may be achieved by the injection of cold olefin feed or by the addition of cold synthesis gas in consumption ratio rather than by recycle of the oxo product as described. Further, the gases purged from settler 15, which comprise hydrogen and carbon monoxide, may be recycled to the oxo reactor, if so desired.

The invention may be illustrated further by the following examples.

TABLE I.—OXONATION CONDITIONS

| | Broad | Preferred | Specific |
|---|---|---|---|
| Temperature, °F | 200–350 | 275–325 | 275–285 |
| Pressure, p.s.i.g | 200–1,500 | 500–1,200 | 1,000 |
| $H_2/CO$, molar ratio | 1–5/1 | 1–3/1 | 1–2/1 |
| CO partial pressure, atmos | 10–30 | 20–30 | 20–25 |
| Catalyst, wt. percent Co on feed | 0.05–1 | 0.1–0.3 | 0.2 |
| Residence time, hrs | 1–10 | 1–4 | 1–3 |

TABLE II.—DECOBALITNG CONDITIONS

| | Broad | Preferred | Specific |
|---|---|---|---|
| Temperature, °F | 300–450 | 350–425 | 390–400 |
| Pressure, p.s.i.g | [1] 200–1,500 | [1] 500–1,200 | 1,000 |
| CO partial pressure, atmos | <15 | <10 | <5 |
| Residence time, hrs | 1–10 | 1–4 | 1–3 |

[1] Not substantially greater than the oxonation pressures employed. If temperature exceeds oxo temperature, a corresponding pressure increase may occur.

TABLE III.—HYDROGENATION CONDITIONS

| | Broad | Preferred | Specific |
|---|---|---|---|
| Temperature, °F | 400–550 | 400–500 | 430–450 |
| Pressure, p.s.i.g | [1] 200–1,500 | [1] 500–1,200 | 1,000 |
| $H_2$ partial pressure, atmos | 10–100 | 30–80 | 65 |
| Residence time, hrs | 1–4 | 3–4 | 3 |

[1] Not substantially greater than the decobalting pressures employed. If temperature exceeds decobalting temperature, a corresponding pressure increase may occur.

*Example 1*

A $C_7$ polymer olefin feed was oxonated at 284° F. in a stirred autoclave using a volume ratio of $H_2$ to CO of about 1/1, a total pressure of 1000–1100 p.s.i.g., and 0.2 weight percent dicobalt octacarbonyl catalyst, calculated as cobalt metal on olefin feed, introduced as a 2 weight percent benzene solution. After a residence time of about 2 hours, during which time 63 percent conversion of olefin to $C_8$ aldehydes was obtained, sufficient gas was bled off and $H_2$ added to maintain the total pressure at about 1000 p.s.i.g., but to reduce the partial CO pressure to about 15 atmospheres. After maintaining the autoclave at 284° F. for one hour, the CO partial pressure was further reduced to 3 atmospheres, and the contents of the autoclave heated for an additional 20 minutes at 347° F. and a total pressure of about 1000 p.s.i.g.

A sample withdrawn from the autoclave contained black, finely divided, cobalt metal suspended therein which was allowed to settle out. A water-white, supernatant liquid, containing only 0.007 weight percent cobalt, was obtained.

This example illustrates the facility with which the soluble cobalt contained in an oxonation product prepared under low pressure conditions and in the presence of preformed cobalt carbonyl catalyst is essentially completely converted by thermal soaking at oxonation pressure into a metallic form.

The example further illustrates the ease with which cobalt in this form is removed from the liquid oxo product.

Example 2

A $C_7$ polymer olefin feed was oxonated under high pressure (3000 p.s.i.g.) at 275°–300° F. using a 1.5/1 volume ratio of hydrogen to carbon monoxide and cobalt tallate (0.2 weight percent Co based on olefin feed) as the carbonylation catalyst. After a residence time of 3 hours at these conditions, the liquid product was removed to a stirred autoclave wherein it was heated for 3 hours at 400° F. under 200 p.s.i.g. hydrogen pressure. The liquid product obtained at the conclusion of this thermal treatment was purple, indicating the presence of soluble cobalt therein.

This example illustrates that even under more stringent conditions of thermal treatment than employed in Example 1, an oxonation product obtained at high pressures and in the presence of a cobalt soap catalyst is incompletely decobalted, substantial amounts of cobalt still remaining in soluble form in the treated product.

Example 3

A $C_7$ polymer olefin feed was oxonated under conditions as set forth in Example 1, except that a cobalt soap, cobalt tallate, was used as the carbonylation catalyst. The conversion of olefin after a residence time of about 2 hours at 302° F. was about 50 percent. As in Example 1, the liquid reaction product was heat-treated at reduced CO partial pressures and under a total pressure of 1000 p.s.i.g. to obtain the following results:

| Temp., ° F. | CO Part. Press., Atms. | Time, Minutes | Cobalt in Product, Wt. Percent |
|---|---|---|---|
| 302 | 34 | 180 | 0.2 |
| 302 | 10 | 45 | 0.05 |
| 392 | 2 | 60 | 0.014 |

Even under these severe heat-treating conditions, the liquid oxonation product, prepared in the presence of a cobalt soap catalyst, contained twice as much dissolved cobalt as that prepared with a preformed cobalt carbonyl catalyst.

This example illustrates that even when the oxonation is conducted at low pressures, fatty acid residues from the carbonylation catalyst, e.g., tallate radicals, interfere with the complete removal of soluble cobalt from the oxonation product by thermal treatment.

Example 4

A $C_7$ polymer olefin feed was oxonated in the presence of preformed cobalt carbonyl (0.2 weight percent cobalt based on feed) at 275° F. and under 1000 p.s.i.g. pressure of synthesis gas having a 1.4/1 volume ratio of $H_2$ to CO. About 50 percent conversion of olefin was obtained within 6 hours. The oxonation product was thereafter heated for 3 hours at 350° F. under 800–1000 p.s.i.g. total synthesis gas pressure, the CO partial pressure having been reduced to less than about 5 atmospheres by purging with hydrogen. The thermally treated oxo product, after allowing the finely divided cobalt metal to settle, was water white, showing that conversion of the soluble cobalt to metal was complete. About 20 weight percent of molybdenum sulfide on charcoal hydrogenation catalyst was thereupon added. Hydrogenation was then carried out for 6 hours at 450° F. under 1000 p.s.i.g. of hydrogen containing about 2 volume percent CO. Essentially complete hydrogenation of all $C_8$ aldehyde in the oxonation product to the corresponding alcohol was accomplished.

While the foregoing general description and illustrative examples will serve to teach the advantages of the invention, it will be apparent to those skilled in the art that modification may be made without departing from the spirit thereof. It is to be understood, therefore, that the invention is to be limited only by the scope of the appended claims.

What is claimed is:

1. A process for producing alcohols which comprises carboxylating an olefin with hydrogen and carbon monoxide, having a molar ratio of $H_2/CO$ of 1/1 to 5/1, in the presence of a cobalt carbonyl catalyst at a pressure between 200 and 1500 p.s.i.g., and a temperature in the range of 200° to 350° F. to produce a reaction mixture comprising aldehydes, dissolved cobalt carbonyls and less than 0.1 weight percent, based on said aldehydes, of acid radicals capable of forming soluble cobalt compounds in said aldehydes under process conditions, maintaining at least a portion of said reaction mixture at a pressure of 200 to 1500 p.s.i.g. but not substantially greater than employed in said carbonylating step and at a temperature sufficient to convert said dissolved cobalt to cobalt metal, removing said cobalt metal from said heat treated reaction mixture and hydrogenating the cobalt free heat-treated reaction mixture to alcohols at a pressure of 200 to 1500 p.si.g. but not substantially greater than employed in said heat-treating step and at a temperture in the range of 400° to 550° F.

2. A process according to claim 1 in which said cobalt carbonyl catalyst is prepared apart from said carbonylating reaction from components free of fatty acid radicals.

3. A process according to claim 2 in which said cobalt carbonyl catalyst is dicobalt octacarbonyl.

4. A process according to claim 1 in which said heat-treated product is hydrogenated in the presence of a molybdenum sulfide hydrogenation catalyst.

5. A process for producing alcohols from olefins which comprises in combination reacting an olefin with hydrogen and carbon monoxide in a carbonylation zone at a pressure between 500 and 1200 p.s.i.g. to produce a product stream containing aldehydes having from 4 to 20 carbon atoms, 0.05 to 1.0 weight percent dissolved cobalt carbonyls, less than 10 mole percent alcohols and less than 0.1 mole percent cobalt soap-forming acid radicals, both said mole percents being based on said aldehydes, and a water concentration of less than 1 weight percent, passing said stream at substantially carbonylation zone pressure to a thermal decobalting zone, maintaining said stream in said thermal decobalting zone in liquid phase at a decobalting temperature in the range of 300° to 450° F. under a total pressure in the range of 500 to 1200 p.s.i.g. and a carbon monoxide partial pressure of less than 5 atmospheres for an average residence time greater than about 30 minutes, thereby producing a liquid slurry containing said aldehydes and in the range of 0.05 to 1.0 weight percent cobalt metal, separating said slurry into an essentially cobalt-free portion and a cobalt concentrate portion, directly flowing said essentially cobalt-free portion without intermediate cooling and substantially at said decobalting zone pressure over a hydrogenation catalyst selected from the group consisting of nickel, copper chromite, and oxides and sulfides of tungsten, nickel and molybdenum maintained as a fixed bed in a hydrogenation zone, said hydrogenation zone being maintained at a temperature in the range of 400° to 550° F. and under a hydrogen partial pressure of at least 30 atmospheres, and recovering a product containing the alcohol corresponding to said aldehydes.

6. A process according to claim 5 wherein hydrogen is separated from said alcohol containing product and at least a portion thereof is recycled to said hydrogenation zone as cooling gas.

7. A process for producing alcohols from aldehydes containing dissolved cobalt compounds which comprises introducing into a heating zone a stream containing $C_4$ to $C_{20}$ aldehydes, 0.05 to 1 weight percent of a soluble cobalt carbonylation catalyst and less than 0.1 weight percent, based on aldehydes, of acid radicals capable under the conditions in said heating zone of solubilizing cobalt in said aldehydes, said stream being at a pressure in the range of 500 to 1200 p.s.i.g., maintaining said stream at said pressure in said heating zone at a temperature between 300° and 450° F. for a time sufficient to remove from said heating zone a heat-treated stream essentially free of soluble cobalt compounds and comprising said aldehydes and cobalt in metallic form, and hydrogenating at least a portion of said heat-treated stream over a hydrogenation catalyst selected from the group consisting of nickel, copper chromite, and the oxides and sulfides of tungsten, nickel and molybdenum without intermediate cooling and at a pressure between 500 and 1200 p.s.i.g. to produce alcohols corresponding to said aldehydes.

References Cited by the Examiner
UNITED STATES PATENTS

| | | |
|---|---|---|
| 2,557,701 | 6/1951 | Smith et al. |
| 2,636,904 | 4/1953 | Starr et al. |
| 2,750,419 | 6/1956 | Taylor et al. |
| 2,779,802 | 1/1957 | Harlan _____ 260—638 |
| 2,815,390 | 12/1957 | Gwynn et al. _____ 260—638 |
| 2,840,619 | 6/1958 | Mason et al. _____ 260—638 |
| 2,843,632 | 7/1958 | Gwynn et al. |
| 2,856,332 | 10/1958 | Mertzweiller. |
| 2,876,264 | 3/1959 | Brodkey et al. _____ 260—638 |

OTHER REFERENCES

Hatch, Higher Oxo Alcohols, 1957, pp. 13–14.

LEON ZITVER, *Primary Examiner.*